3,287,101
SYNERGISTIC HERBICIDAL COMPOSITION
AND METHOD
Ralston Curtis, Los Altos, and Thomas L. Snell, Hayward, Calif., assignors to Stauffer Chemical Company, New York, N.Y., a corporation of Delaware
No Drawing. Filed Jan. 8, 1964, Ser. No. 336,390
2 Claims. (Cl. 71—2.3)

This invention relates to the use of combinations of disodium methylarsonate and p-chlorophenyl-ω-(N,N-diethylaminoethyl) sulfide and its related hydrochloride salt as synergists for herbicidal control of certain plant species.

The control of grasses and weeds in various areas is a recurring problem. Many herbicides have been developed which control broad varieties of weeds, as well as selected weed varieties. Evaluation is made as to the effective range of variety control. In addition, the evaluation must be extended concerning the effect of the herbicide on desired commercial crops. The heribicidal material adapted to accomplish the control of grasses and weeds in commercial crops may be entirely unsatisfactory because of its poor selectivity and injury to the cultivated crop.

A considerable assortment of herbicidal materials have been developed and exploited for the control of weeds. Among this assortment of herbicidal materials is the organic arsenical compounds, and more specifically disodium methylarsonate. Organic arsenicals have been used in medicine for a long time but their use as phytocides is quite recent. Disodium methylarsonate is much less hazardous to use than the inorganic salt, sodium arsenite. Following common usage, the term DSMA will be used hereinafter as a term covering disodium methylarsonate. DSMA is particularly selective against annual grasses such as crabgrass, watergrass, foxtail and witch grass. DSMA is a commercially available herbicide.

It has been discovered that the combination of DSMA and p-chlorophenyl-ω-(N,N-diethylaminoethyl) sulfide or its related hydrochloride salt constitutes a preferred herbicidal composition for the control of various plant species. It has also been found that in said composition combinations the compounds are mutually activating to accomplish a greater than additive herbicidal effect, that is, a synergistic effect.

More specifically, this invention relates to the use of the synergistic combination of disodium methylarsonate and p-chlorophenyl-ω-(N,N-diethylaminoethyl) sulfide corresponding to the formula

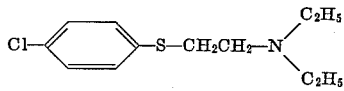

or its related hydrochloride salt, for the control of various plant species. The latter compound and its related hydrochloride salt are in themselves active herbicides.

To be an effective synergistic combination the present invention must show mutual interaction of the phytotoxic chemicals so as to produce a response which is greater than the sum of each individual phytocide. The said interaction is the relation of one material to the effectiveness of a second. The interaction can be of great importance in herbicidal formulation and activity. The actual interaction of the phytotoxic materials may not be known, be it penetration, an ultimate biochemical effect, or a combined effect at the action site; however, the effect of the interaction may be quite noticeable.

The compounds of the present invention can be employed along with a carrier in the form of a spray or dust composition. In operating in accordance with the present invention, a mixture of DSMA and p-chlorophenyl-ω-(N,N-diethylaminoethyl)sulfide or its related hydrochloride salt can be so compounded as to produce herbicidal concentrates adaptable to use of the preparation in spray or dust mixtures. Methods of adaption of the herbicides to produce useful spray mixtures, dusts or drenches will be evident to those skilled in the art.

Any suitable proportion of the DSMA may be employed in combination with p-chlorophenyl-ω-(N,N-diethylaminoethyl) sulfide and its related hydrochloride salt. The preferred amounts of materials are dependent upon the method of application, the nature of the weed to be controlled, as well as the commercial crop also possibly present.

The following examples will illustrate the effective interaction of the combination of the present invention.

Example 1

This example will demonstrate the synergistic effect of the combination of DSMA and p-chlorophenyl-ω-(N,N-diethylaminoethyl) sulfide (CPS).

The herbicidal compositions were applied as foliage sprays. This was accomplished by first growing the plant species in 8" x 12" x 3" metal flats containing 10 lbs. of soil. The weed used in this test was Johnson grass grown from rhizomes. The DSMA and CPS were prepared in aqueous solution with 1% X-77 spreader added. When the plants were at the 4–5 leaf stage (16 days old), the foliage was sprayed from overhead while the flats moved on a conveyor belt under the spraying apparatus. Spraying was at a dilution of 80 gal./acre. The average percent kill was recorded 20 days after application. Percent kill is based on counts of established shoots that have died. The results are given in Table 1.

TABLE 1.—POST-EMERGENCE TREATMENT OF JOHNSON GRASS

| Treatment | Rate (lbs./A.) | Percent Kill |
|---|---|---|
| DSMA | 20 | 55 |
| CPS | 20 | 14 |
| DSMA+CPS | 10+10 | 70 |

The combination at a reduced individual rate increased the herbicidal effect on the post-emergence treatment of Johnson grass. The combination of DSMA and the CPS was much better than the higher individual rate and application.

Example 2

This example concerns field plot tests wherein the synergistic effect of DSMA and p-chlorophenyl-ω-(N,N-diethylaminoethyl) sulfide hydrochloride (CPS·HCl) is demonstrated.

The herbicidal compositions were applied as foliage sprays. Two grassy weeds, watergrass and crabgrass, were seeder planted. The pigweed was natural occurring. Plot sizes were 4 feet by 14.5 feet. All materials for spraying were prepared in a 3:1 water/acetone solution containing 0.5% Tween 20, an emulsifying agent. Spraying was accomplished by hand operated tank sprayer. Materials were applied in a dilution of 100 gal./acre. The plots were rated after 19 days for percent control, considering reduced size and injury symptoms. The results are tabulated in the following table.

TABLE 2.—POST-EMERGENCE TREATMENT OF PIGWEED, WATERGRASS AND CRABGRASS

| Treatment | Rate (lbs./A.) | Percent Control | | |
|---|---|---|---|---|
| | | Pigweed | Watergrass | Crabgrass |
| DSMA | 6 | 60 | 40 | 60 |
| CPS·HCl | 6 | 96 | 50 | 40 |
| DSMA+CPS·HCl | 3+3 | 95 | 65 | 90 |

Example 3

In the use of an effective synergistic combination the phytotoxicity to desirable crop plants must be low in order to avoid harming the crop plant. The combination of the present invention was tested with cotton and a group of five weed species.

The five weed species and the cotton were seeder planted in plots 3 feet by 14.5 feet. When the plants were 24 days old they were sprayed as described in the previous example. Materials for spraying were prepared in 1:1 acetone/water solutions with 1% Tween 20 emulsifier present. Ratings of percent kill were made at 14 days, considering reduced size and injury symptoms. The results obtained are listed in Table 3.

TABLE 3.—TREATMENT OF 5 WEED SPECIES IN THE PRESENCE OF COTTON

| Treatment | Rate (lbs./A) | Percent Kill | | | | | |
|---|---|---|---|---|---|---|---|
| | | Cotton | Wild Oats | Mustard | Crabgrass | Pigweed | Watergrass |
| DSMA | 6 | 30 | 60 | 70 | 70 | 60 | 40 |
| CPS | 6 | 80 | 70 | 95 | 80 | 92 | 40 |
| DSMA+CPS | 3+3 | 30 | 80 | 97 | 90 | 97 | 70 |

The combination at a lower individual rate is less harmful to cotton, while maintaining an effective rate of kill on the listed weeds. This factor makes the combination especially desirable for weed control in cotton.

Various changes and modifications may be made without departing from the spirit and scope of the invention described herein as will be apparent to those skilled in the art to which it pertains. It is accordingly intended that the present invention shall only be limited by the scope of the appended claims.

We claim:
1. An herbicidal composition comprising disodium methylarsonate and a synergistic amount of a material selected from the group consisting of p-chlorophenyl-ω-(N,N-diethylaminoethyl) sulfide and p-chlorophenyl-ω-(N,N-diethylaminoethyl) sulfide hydrochloride.

2. An improved method for combatting weeds comprising applying to the soil a phytotoxic amount of the synergistic herbicidal composition comprising disodium methylarsonate and a synergistic amount of a material selected from the group consisting of p-chlorophenyl-ω-(N,N-diethylaminoethyl) sulfide and p-chlorophenyl-ω-(N,N-diethylaminoethyl) sulfide hydrochloride.

References Cited by the Examiner

UNITED STATES PATENTS

| | | | |
|---|---|---|---|
| 2,678,265 | 5/1954 | Schwerdle | 71—2.7 |
| 3,142,554 | 7/1964 | Godfrey | 71—2.3 |
| 3,169,850 | 2/1965 | Thompson | 71—2.3 |

LEWIS GOTTS, *Primary Examiner.*

JAMES O. THOMAS, JR., *Examiner.*